United States Patent
Huang (10) Patent No.: US 12,483,938 B2
(45) Date of Patent: Nov. 25, 2025

(54) CALL NETWORK SWITCHING METHOD AND DEVICE, AND MEMORY

(71) Applicant: HUIZHOU TCL MOBILE COMMUNICATION CO., LTD, Guangdong (CN)

(72) Inventor: Xiaodong Huang, Guangdong (CN)

(73) Assignee: HUIZHOU TCL MOBILE COMMUNICATION CO., LTD, Guangdong (CN)

( * ) Notice: Subject to any disclaimer, the term of this patent is extended or adjusted under 35 U.S.C. 154(b) by 331 days.

(21) Appl. No.: 17/807,790

(22) Filed: Jun. 20, 2022

(65) Prior Publication Data

US 2022/0322158 A1 Oct. 6, 2022

Related U.S. Application Data

(63) Continuation of application No. PCT/CN2020/075994, filed on Feb. 20, 2020.

(30) Foreign Application Priority Data

Dec. 20, 2019 (CN) .......................... 201911323228.3

(51) Int. Cl.
*H04W 36/00* (2009.01)
*H04W 36/34* (2009.01)
(Continued)

(52) U.S. Cl.
CPC ....... *H04W 36/0005* (2013.01); *H04W 36/34* (2013.01); *H04W 60/00* (2013.01); *H04W 36/1446* (2023.05); *H04W 80/04* (2013.01)

(58) Field of Classification Search
CPC . H04W 36/0005; H04W 36/34; H04W 60/00; H04W 36/1446; H04W 80/04;
(Continued)

(56) References Cited

U.S. PATENT DOCUMENTS 6,411,806 B1 * 6/2002 Garner ................ H04W 12/062
455/430
8,830,959 B2 * 9/2014 Long ................ H04W 36/0066
370/466
(Continued)

FOREIGN PATENT DOCUMENTS

CN 101401386 A * 4/2009 ............. H04L 12/16
CN 101877898 A 11/2010
(Continued)

OTHER PUBLICATIONS

International Search Report in International application No. PCT/CN2020/075994, mailed on Aug. 31, 2020.
(Continued)

*Primary Examiner* — Atique Ahmed
(74) *Attorney, Agent, or Firm* — PV IP PC; Wei Te Chung (57) ABSTRACT

Embodiments of the present disclosure are directed to a switching method and a switching device. When a mobile terminal needs to be switched from a first communication network to a second communication network, detecting whether the mobile terminal is in a ringing state. When the mobile terminal is in the ringing state, detecting whether the mobile terminal is switched from the ringing state into a connecting state within a predetermined time period. When the mobile terminal is switched from the ringing state into the connecting state within the predetermined time period, performing an IMS registration through the second communication network to connect the mobile terminal to the second communication network.

20 Claims, 5 Drawing Sheets

(51) Int. Cl.
*H04W 60/00* (2009.01)
*H04W 36/14* (2009.01)
*H04W 80/04* (2009.01)

(58) Field of Classification Search
CPC .... H04W 4/16; H04W 88/06; H04L 65/1016; H04L 65/1069; H04L 65/1073; H04M 3/02; H04M 7/1205; H04M 3/42051; H04M 3/42229

See application file for complete search history.

(56) References Cited

U.S. PATENT DOCUMENTS

| | | | | |
|---|---|---|---|---|
| 2006/0111134 | A1* | 5/2006 | Mills | H04W 76/45 455/518 |
| 2008/0095339 | A1* | 4/2008 | Elliott | H04L 47/805 379/93.01 |
| 2010/0310063 | A1* | 12/2010 | Moon | H04M 3/4211 379/215.01 |
| 2016/0142447 | A1* | 5/2016 | Mufti | H04L 65/1016 370/259 |
| 2016/0286038 | A1* | 9/2016 | Georgiou | H04M 3/4285 |
| 2019/0028944 | A1 | 1/2019 | Peitzer | |
| 2019/0037173 | A1* | 1/2019 | Lee | G06F 3/04842 |
| 2019/0132890 | A1 | 5/2019 | Bollapalli et al. | |

FOREIGN PATENT DOCUMENTS

| | | | | |
|---|---|---|---|---|
| CN | 102131263 | A | | 7/2011 |
| CN | 102387117 | A | | 3/2012 |
| CN | 104519537 | A | * | 4/2015 ............ H04W 36/00 |
| CN | 104969616 | A | * | 10/2015 ........ H04W 36/0066 |
| CN | 106255083 | A | | 12/2016 |
| CN | 107079230 | A | | 8/2017 |
| CN | 107222896 | A | | 9/2017 |
| CN | 107580343 | A | | 1/2018 |
| CN | 109120771 | A | | 1/2019 |
| CN | 109275166 | A | | 1/2019 |
| CN | 109688610 | A | | 4/2019 |

OTHER PUBLICATIONS

Written Opinion of the International Search Authority in International application No. PCT/CN2020/075994, mailed on Aug. 31, 2020.

Notification to Grant Patent Right for Invention issued in corresponding Chinese Patent Application No. 201911323228.3 dated Aug. 4, 2021, pp. 1-4.

Chinese Office Action issued in corresponding Chinese Patent Application No. 201911325069.0 dated Aug. 17, 2020, pp. 1-7.

\* cited by examiner

CALL NETWORK SWITCHING METHOD AND DEVICE, AND MEMORY

CROSS REFERENCE OF RELATED APPLICATION

This application is a continuation application of an International Application No. PCT/CN2020/075994, filed on Feb. 20, 2020, which claims the priority of Chinese Patent Application No. 201911323228.3, entitled "CALL NETWORK SWITCHING METHOD AND DEVICE, AND MEMORY", filed on Dec. 20, 2019, the disclosure of which is incorporated herein by reference in its entirety.

FIELD OF THE DISCLOSURE

The present disclosure relates to a communication technology, and more particularly, to a switching method of a communication network, a switching device and a storage medium.

BACKGROUND

IP Multimedia Subsystem (IMS) is a new form of multimedia operations. It could meet the demands for novel and various multimedia operations of mobile terminal customers. Currently, IMS is regarded as a core technology of the next-generation networks and an important way to combine the mobile terminal with the fixed network to introduce the voice, data and video services.

The conventional IMS system supports various voice services. Different voice services rely on different communication systems. During the mobile terminal is performing an IMS communication, the mobile terminal could be switched to different communication networks. After the phone connection is established, the switch of the communication will not affect the communication, which means that the communication will not be interrupted. However, in a ringing state (when the connection is not established), if the communication network is switched, then the communication will be terminated. Thus, the user needs to make a call again. This means that the mobile terminal may lose the connection during the ringing state and reduce the phone connection rate.

SUMMARY

One objective of an embodiment of the present disclosure is to provide a switching method of a communication network, a switching device and a storage medium, to alleviate the issue that the mobile terminal may lose the connection during the ringing state and raise the phone connection rate.

According to an embodiment of the present disclosure, a switching method of a communication network is provided. The switching method includes: when a mobile terminal needs to be switched from a first communication network to a second communication network, detecting whether the mobile terminal is in a ringing state; upon a condition that the mobile terminal is in the ringing state, detecting whether the mobile terminal is switched from the ringing state into a connecting state within a predetermined time period; and upon a condition that the mobile terminal is switched from the ringing state into the connecting state within the predetermined time period, performing an IMS registration through the second communication network to connect the mobile terminal to the second communication network.

Optionally, the step of detecting whether the mobile terminal is switched from the ringing state into the connecting state comprises: activating a timer, wherein a timeout period of the timer is the predetermined time period; periodically detecting whether the mobile terminal receives a connecting information; upon a condition that the mobile terminal receives the connecting information, determining that the mobile terminal is switched from the ringing state into the connecting state within the predetermined time period; and upon a condition that the timer passes the timeout period, determining that the mobile terminal is not switched from the ringing state into the connecting state within the predetermined time period.

Optionally, the switching method further comprises: when the timer passes the timeout period, performing the IMS registration through the second communication network to connect the mobile terminal to the second communication network.

Optionally, the switching method further comprises: establishing a connection channel between the mobile terminal and the IMS core network before the step of detecting whether the mobile terminal is in the ringing state.

Optionally, the switching method further comprises: upon a condition that a signal amplitude of the first communication network is detected to be lower than a first threshold value and a signal amplitude of the second communication network reaches a second threshold value, determining that the mobile terminal needs to be switched from the first communication network to the second communication network.

Optionally, the first communication network is an LTE network and the second communication network is a WiFi network.

Optionally, the first communication network is a WiFi network and the second communication network is an LTE network.

According to another embodiment of the present disclosure, a switching device of a communication network is provided. The switching device includes a first detecting module, a second detecting module, and a switching module. The first detecting module detects whether a mobile terminal is in a ringing state when the mobile terminal needs to be switched from a first communication network to a second communication network. The second detecting module detects whether the mobile terminal is switched from the ringing state into a connecting state within a predetermined time period if the mobile terminal is in the ringing state. The switching module performs an IMS registration through the second communication network to connect the mobile terminal to the second communication network when the mobile terminal is switched from the ringing state into the connecting state within the predetermined time period.

Optionally, the second detecting module comprises an activation unit, a detecting unit, a first determining unit, and a second detecting unit. The activation unit activates a timer and sets a timeout period of the timer as the predetermined time period. The detecting unit periodically detect whether the mobile terminal receives a connecting information. The first determining unit determines that the mobile terminal is switched from the ringing state into the connecting state within the predetermined time period when the mobile terminal receives the connecting information. The second detecting unit determines that the mobile terminal is not switched from the ringing state into the connecting state within the predetermined time period if the timer passes the timeout period.

Optionally, the switching module performs the IMS registration through the second communication network to connect the mobile terminal to the second communication network when the timer passes the timeout period.

Optionally, the switching device further comprises a channel establishment module that establishes a connection channel between the mobile terminal and the IMS core network.

Optionally, the switching device further comprises a determining module which determines that the mobile terminal needs to be switched from the first communication network to the second communication network when a signal amplitude of the first communication network is detected to be lower than a first threshold value and a signal amplitude of the second communication network reaches a second threshold value.

Optionally, the first communication network is an LTE network and the second communication network is a WiFi network.

According to another embodiment of the present disclosure, a non-transitory computer readable medium is disclosed. The non-transitory computer readable medium stores instructions executed by a processor to perform operations comprising: when a mobile terminal needs to be switched from a first communication network to a second communication network, detecting whether the mobile terminal is in a ringing state; upon a condition that the mobile terminal is in the ringing state, detecting whether the mobile terminal is switched from the ringing state into a connecting state within a predetermined time period; and upon a condition that the mobile terminal is switched from the ringing state into the connecting state within the predetermined time period, performing an IMS registration through the second communication network to connect the mobile terminal to the second communication network.

Optionally, the operation of detecting whether the mobile terminal is switched from the ringing state into the connecting state comprises: activating a timer, wherein a timeout period of the timer is the predetermined time period; periodically detecting whether the mobile terminal receives a connecting information; upon a condition that the mobile terminal receives the connecting information, determining that the mobile terminal is switched from the ringing state into the connecting state within the predetermined time period; and upon a condition that the timer passes the timeout period, determining that the mobile terminal is not switched from the ringing state into the connecting state within the predetermined time period.

Optionally, the operations further comprise: when the timer passes the timeout period, performing the IMS registration through the second communication network to connect the mobile terminal to the second communication network.

Optionally, the operations further comprise: establishing a connection channel between the mobile terminal and the IMS core network before the step of detecting whether the mobile terminal is in the ringing state.

Optionally, the operations further comprise: when a signal amplitude of the first communication network is detected to be lower than a first threshold value and a signal amplitude of the second communication network reaches a second threshold value, determining that the mobile terminal needs to be switched from the first communication network to the second communication network.

Optionally, the first communication network is an LTE network and the second communication network is a WiFi network.

Optionally, the first communication network is a WiFi network and the second communication network is an LTE network.

The switching method, the switching device and the storage medium of the communication network according to an embodiment of the present disclosure could detect whether the mobile terminal is in a ringing state when the mobile terminal needs to be switched from a first communication network to a second communication network. If the mobile terminal is in the ringing state, then it detects whether the mobile terminal is switched from the ringing state into a connecting state within a predetermined time period. If yes, then the IMS registration is performed through the second communication network to connect the mobile terminal to the second communication network such that the network switch could be achieved after the communication connection of the mobile terminal is established. This could prevent the mobile terminal from losing the connection due to the network switch, reduce the rate of losing connections during the ringing state, and raise the phone connection rate.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION

The disclosure is described below in detail with reference to the accompanying drawings, wherein like reference numerals are used to identify like elements illustrated in one or more of the figures thereof, and in which exemplary embodiments of the disclosure are shown. This disclosure may, however, be embodied in many different forms and should not be construed as limited to the particular embodiments set forth herein. Rather, these embodiments are provided so that this disclosure will be thorough and complete, and will fully convey the scope of the disclosure to those skilled in the art.

Embodiments of the present disclosure are directed to a switching method of a communication network. The switching method includes: when a mobile terminal needs to be switched from a first communication network to a second communication network, detecting whether the mobile terminal is in a ringing state; upon a condition that the mobile terminal is in the ringing state, detecting whether the mobile terminal is switched from the ringing state into a connecting state within a predetermined time period; and upon a condition that the mobile terminal is switched from the ringing state into the connecting state within the predetermined time period, performing an IMS registration through the second communication network to connect the mobile terminal to the second communication network.

Figure 1:
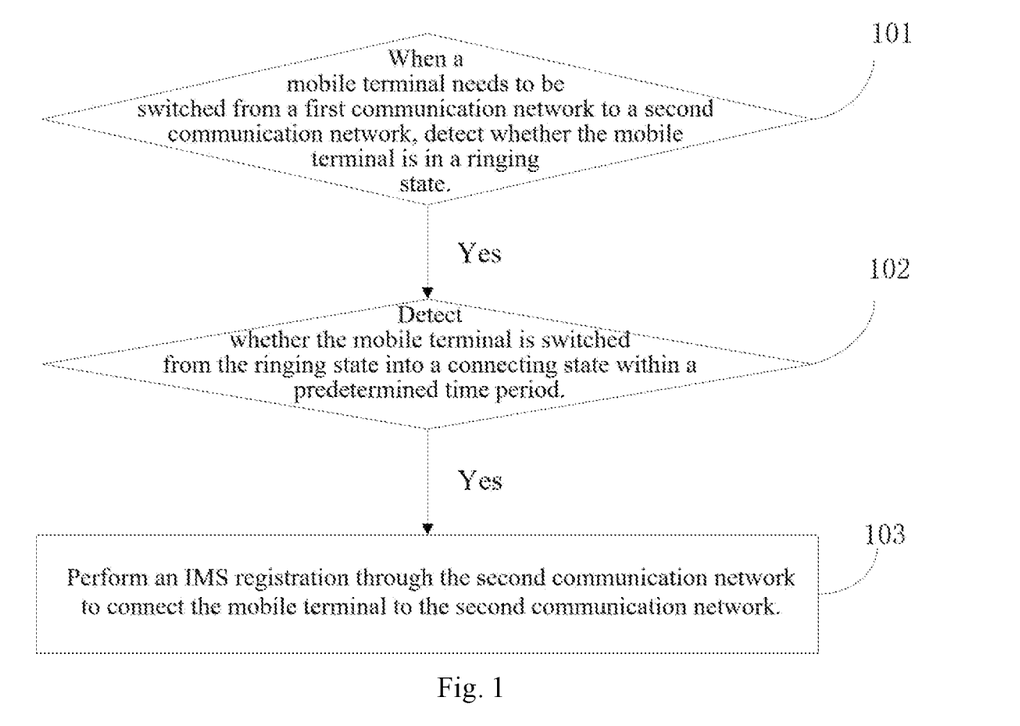
FIG. 1 is a flow chart of a switching method of a communication network according to an embodiment of the present disclosure.

Please refer to FIG. 1. FIG. 1 is a flow chart of a switching method of a communication network according to an embodiment of the present disclosure. The switching method comprises:

Step 101: when a mobile terminal needs to be switched from a first communication network to a second communication network, detecting whether the mobile terminal is in a ringing state. If yes, then perform Step 102.

In this embodiment, the first communication network is a network that the mobile terminal is currently connected to, and the second communication network is another communication network that the mobile terminal could be connected to. For example, the voice services of IMS include VoLTE (Voice over LTE) and VoWiFi (Voice over WiFi). VoLTE is a communication technology where the mobile terminal utilizes the LTE network to connect to the IMS system to establish the communication channel and communicate under the SIP (Session Initiation Protocol). VoWiFi is a communication technology where the mobile terminal utilizes the WiFi network to connect to the IMS system to establish the communication channel and communicate under the SIP (Session Initiation Protocol) after a safe connection is established. SIP is a command protocol for establishing, maintaining and finishing multimedia.

The communication network that the mobile terminal could be connected to comprises the LTE network and the WiFi network. If the mobile terminal is currently connected to the LTE network, then the second communication network could be the WiFi network. If the mobile terminal is currently connected to the WiFi network, then the second communication network could be the LTE network.

The service provider could predetermine the network switch condition. When the mobile terminal detects that the two communication networks meet the network switch condition, the mobile terminal needs to be switched between the communication networks. Specifically, the switching method further comprises:

If the signal amplitude of the first communication network is detected to be lower than a first threshold value and the signal amplitude of the second communication network reaches a second threshold value, this means that the mobile terminal detects that the signal amplitude of the second communication network is better and the signal amplitude of the first communication network is worse. Thus, the mobile terminal needs to be switched from the first communication network to the second communication network.

When the mobile terminal needs to perform the network switch, a connection channel between the mobile terminal and the IMS core network should be established for the following IMS registration. Here, the connection channel could be an IPsec channel. IPsec is a safety protocol to authenticate and encrypt the IP communication. In this embodiment, the ePDG (evolved Packet Data Gateway) could be used to establish the IPsec channel between the mobile terminal and the IMS core network. The ePDG is a network equipment for authenticating the mobile terminal connected to IMS core network through the WiFi network and establishing the IPsec channel.

After the connection channel is established, the mobile terminal detects the current communication state. The communication state could comprise a ringing state, a connecting state, and an idle state. The step 101 mainly detects whether the communication state of the mobile terminal is a ringing state. In this embodiment, the mobile terminal is a calling party. Therefore, the ringing state means the state when the mobile terminal is calling a called party and wait for the called party to answer (establish the connection).

The step of detecting whether the mobile terminal is in the ringing state could be performed by detecting whether the mobile terminal receives a ringing information. Specifically, the mobile terminal dialed a number to request a connection with the called party. After the called party receives the connection request, the called party feedbacks the SIP 180 Ringing (the ringing information). If the mobile terminal receives the ringing information but does not receive another state information (such as a connection information or a termination information). This means that the mobile terminal is in the ringing state and the step 102 is then performed. Otherwise, the mobile terminal is not in the ringing state.

When the mobile terminal is not in the ringing state, the communication network switch does not affect the communication of the mobile terminal. Therefore, the communication network of the mobile terminal could be directly switched. That is, the mobile terminal sends a registration to the IMS core network through the second communication network based on the connection channel between the mobile terminal and the IMS core network. After the IMS registration is completed, the mobile terminal could be connected to the second communication network to switch the mobile terminal from the first communication network to the second communication network.

Step 102: detecting whether the mobile terminal is switched from the ringing state into a connecting state within a predetermined time period. If yes, then perform Step 103.

In this embodiment, when the mobile terminal is detected to be in the ringing state, the communication state of the mobile terminal is detected. The step 102 detects whether the communication state of the mobile terminal is a ringing state transits from the ringing state to the connecting state. Please note, this detection cannot be performed forever, otherwise it will affect other IMS operations. Therefore, in this embodiment, a predetermined time period is set such that the detection could be performed within the predetermined time period.

Specifically, in Step 102, the step of detecting whether the mobile terminal is switched from the ringing state into the connecting state within the predetermined time period comprises: activating a timer; here, a timeout period of the timer is the predetermined time period; periodically detecting whether the mobile terminal receives a connecting information; if yes, then determining that the mobile terminal is switched from the ringing state into the connecting state within the predetermined time period; and if not, then determining that the mobile terminal is not switched from the ringing state into the connecting state within the predetermined time period.

It should be noted that the detection of the predetermined time period could be achieved through a timer. When the mobile terminal is detected to be in the ringing state, the time is activated. The overtime period of the timer is predetermined. The overtime period could be set as the predetermined time period (such as 15 seconds). The time period could be determined or selected based on the possibility that the called party answered the call. That is, within the predetermined time period, the called party is more possible to answer the call.

Before the overtime period of the timer passes, the communication state of the mobile phone is real-time detected to see if the communication state transits from the ringing state into the connecting state. This detection could be achieved by detecting whether the mobile terminal receives the connection information. Specifically, the called party sends the SIP 200 OK (the connection information) after the called party answers the call. If the mobile terminal receives the connection information from the called party, this means that the communication state of the mobile terminal transits from the ringing state to the connection state and thus the timer is stopped. If the mobile terminal does not receive the connection information from the called party or does not receive any other state information (such as termination information), it means that the mobile terminal is still in the ringing state. After the timeout period of the timer passes, if the mobile terminal still does not receive the connection information from the called party, this means that the mobile terminal is not switched from the ringing state to the connecting state within the predetermined time period.

Step 103: performing an IMS registration through the second communication network to connect the mobile terminal to the second communication network.

In this embodiment, within the predetermined time period, if the mobile terminal is detected to be switched from the ringing state to the connecting state, then an IMS registration is performed through the second communication network based on the connection channel between the mobile terminal and the IMS core network. After the IMS registration is completed, the mobile terminal could be connected to the second communication network such that the switch between the first communication network and the second communication network is completed.

Conventionally, when the mobile terminal performs an IMS registration in the ringing state, the IMS core network sends the termination information to the mobile terminal to terminate the communication of the mobile terminal. Therefore, in this embodiment, the IMS registration is performed after the mobile terminal is switched from the ringing state to the connecting state to avoid the termination of the communication of the mobile terminal due to the termination information sent from the IMS core network.

Furthermore, the method further comprises: when the timer passes the timeout period, performing the IMS registration through the second communication network to connect the mobile terminal to the second communication network.

Please note, if the mobile terminal is not switched from the ringing state to the connecting state within the predetermined time period, then the mobile terminal performs the IMS registration to switch the mobile terminal to the second communication network to avoid affecting other IMS operations due to the long-time waiting.

Figure 2:
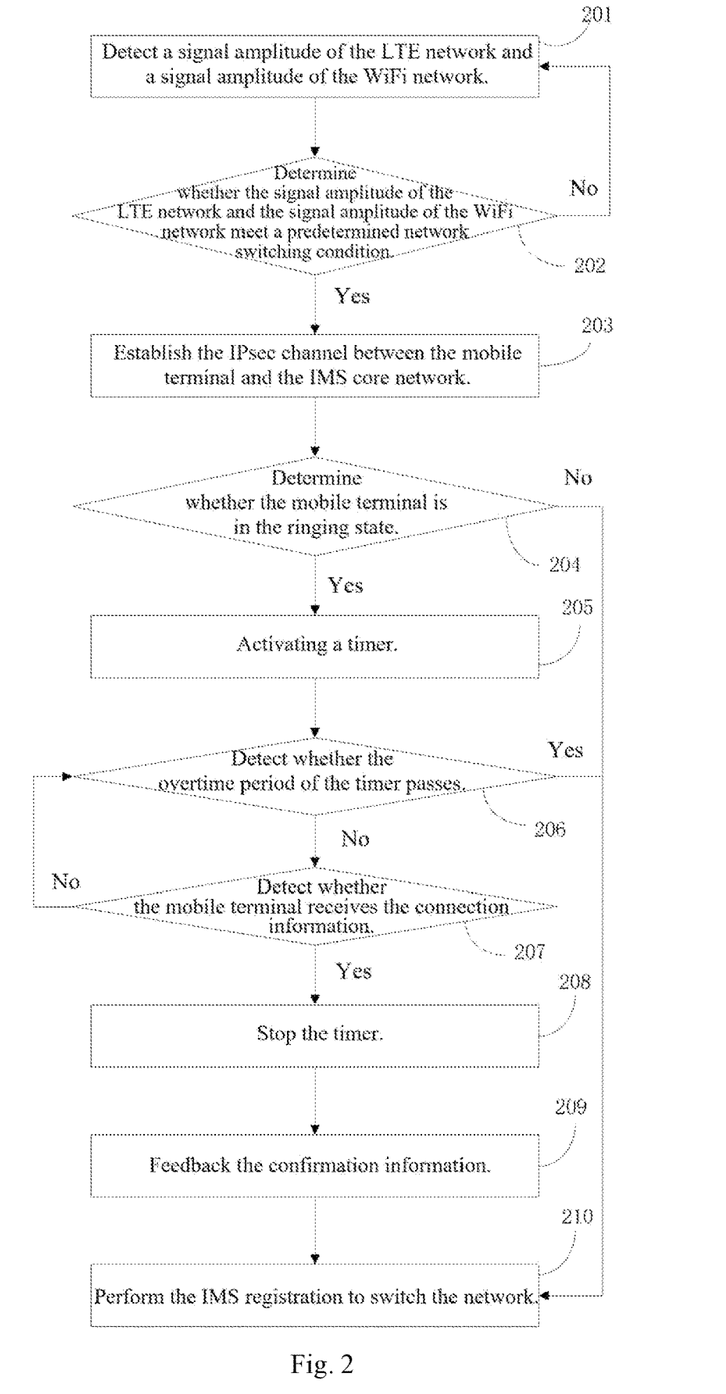
FIG. 2 is a flow chart a switching method of a communication network according to another embodiment of the present disclosure.

Please refer to FIG. 2. FIG. 2 is a flow chart a switching method of a communication network according to another embodiment of the present disclosure. The switching method comprises:

Step 201: detecting a signal amplitude of the LTE network and a signal amplitude of the WiFi network.

Here, the communication networks that the mobile terminal could be connected to comprise the LTE network or the WiFi network.

Step 202: determine whether the signal amplitude of the LTE network and the signal amplitude of the WiFi network meet a predetermined network switching condition. If yes, then perform Step 103. If not, then go back to Step 201.

The network switch condition could be that the signal amplitude of the currently-connected communication network is lower than a first threshold value and the signal amplitude of the communication network to be connected to reaches a second threshold value. For example, the mobile terminal is currently connected to the LTE network. If the signal amplitude of the LTE network is detected to be lower than the first threshold value and the signal amplitude of the WiFi network reaches the second threshold value, then the network switch condition is determined to be met.

Step 203: establishing the IPsec channel between the mobile terminal and the IMS core network.

If the mobile terminal is currently in the ringing state, then the channel is established in the Step 203 to get more time for the connection of the following communication (call) and raise the possibility for the call to be established in the following predetermined time period.

Step 204: determining whether the mobile terminal is in the ringing state. If yes, then perform Step 205. If not, then perform Step 210.

When the mobile terminal receives the ringing information from the called party, it determines that the mobile terminal is in the ringing state. When the mobile terminal does not receive the ringing information from the called party, it determines that the mobile terminal is not in the ringing state.

Step 205: activating a timer.

The overtime period of the timer could be set as the predetermined time period. The possibility for the call to be answered within the predetermined time period is comparatively higher.

Step 206: detecting whether the overtime period of the timer passes. If yes, then perform Step 210. If not, perform Step 207.

Step 207: detecting whether the mobile terminal receives the connection information. If yes, then perform Step 208. If not, go back to Step 206.

When the mobile terminal receives the connecting information sent from the called party, the call is connected. If the mobile terminal does not receive the connecting information sent from the called party, the call is not connected and the mobile terminal is still in the ringing state.

Step 208: stopping the timer.

Step 209: feedbacking the confirmation information.

When the mobile terminal receives the connecting information from the called party, the mobile terminal feedbacks a confirmation information ACK.

Step 210: performing the IMS registration to switch the network.

The mobile terminal performs the IMS registration to the IMS core network based on the IPsec channel. When the registration is completed, the network switch is completed.

From the above, it could be known that the switching method of the communication network could detect whether the mobile terminal is in the ringing state when the mobile terminal needs to be switched from the first communication network to the second communication network. If the mobile terminal is in the ringing state, then the mobile terminal detects whether the mobile terminal is switched from the ringing state into a connecting state within a predetermined time period. If yes, then the mobile terminal performs the IMS registration through the second communication network to connect the mobile terminal to the second communication network such that the network switch is completed after the communication connection is established. This could prevent the mobile terminal from losing the connection due to the network switch, reduce the rate of losing connections during the ringing state, and raise the phone connection rate. Furthermore, it could avoid ruining the user experience and/or other loses if the user needs to redial because of the connection failure.

According to the above-mentioned switching method, the switching device of the communication network will be illustrated in the following disclosure. The switching device could be integrated in the mobile terminal. The mobile terminal could be a cell phone or a tablet.

Figure 3:
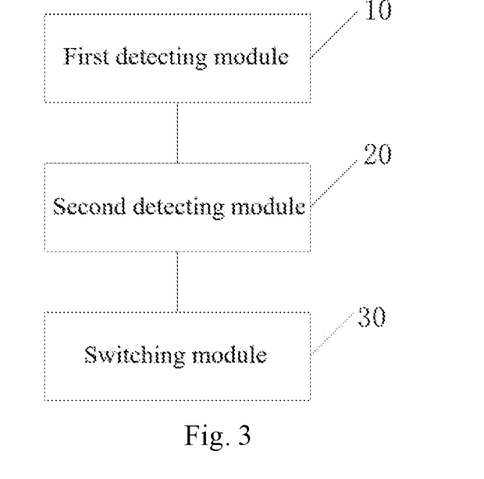
FIG. 3 is a functional block diagram of a switching device of a communication network according to an embodiment of the present disclosure.

Please refer to FIG. 3. FIG. 3 is a functional block diagram of a switching device of a communication network according to an embodiment of the present disclosure. The switching device comprises a first detecting module 10, a second detecting module 20 and a switching module 30.

The first detecting module 10 is configured to detect whether a mobile terminal is in a ringing state when the mobile terminal needs to be switched from a first communication network to a second communication network.

The second detecting module 20 is configured to detect whether the mobile terminal is switched from the ringing state into a connecting state within a predetermined time period if the mobile terminal is in the ringing state.

The switching module 30 is configured to perform an IMS registration through the second communication network to connect the mobile terminal to the second communication network if the mobile terminal is switched from the ringing state into the connecting state within the predetermined time period.

Figure 4:
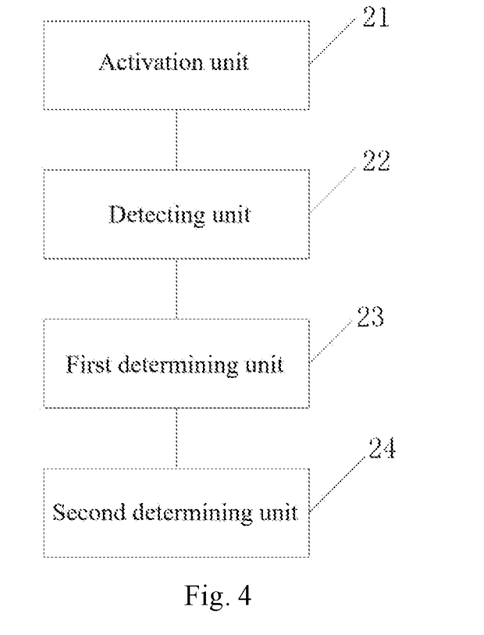
FIG. 4 is a functional block diagram of a second detecting module of a switching device of a communication network according to an embodiment of the present disclosure.

As shown in FIG. 4, the second detecting module 20 comprises: an activation unit 21, a detecting unit 22, a first determining unit 23, and a second determining unit 24.

The activation unit 21 is configured to activate a timer and set a timeout period of the timer as the predetermined time period. The detecting unit 22 is configured to periodically detect whether the mobile terminal receives a connecting information. The first determining unit 23 is configured to determine that the mobile terminal is switched from the ringing state into the connecting state within the predetermined time period if the mobile terminal receives the connecting information. The second detecting unit 24 is configured to determine that the mobile terminal is not switched from the ringing state into the connecting state within the predetermined time period if the timer passes the timeout period.

In some embodiments of the present disclosure, the switching device further comprises: a channel establishing module, configured to establish a connection channel between the mobile terminal and the IMS core network.

From the above, it could be understood that the switch device of the communication network and the memory could detect whether the mobile terminal is in the ringing state when the mobile terminal needs to be switched from the first communication network to the second communication network. If the mobile terminal is in the ringing state, then the mobile terminal detects whether the mobile terminal is switched from the ringing state into a connecting state within a predetermined time period. If yes, then the mobile terminal performs the IMS registration through the second communication network to connect the mobile terminal to the second communication network such that the network switch is completed after the communication connection is established. This could prevent the mobile terminal from losing the connection due to the network switch, reduce the rate of losing connections during the ringing state, and raise the phone connection rate. Furthermore, it could avoid ruining the user experience and/or other loses if the user needs to redial because of the connection failure.

Figure 5:
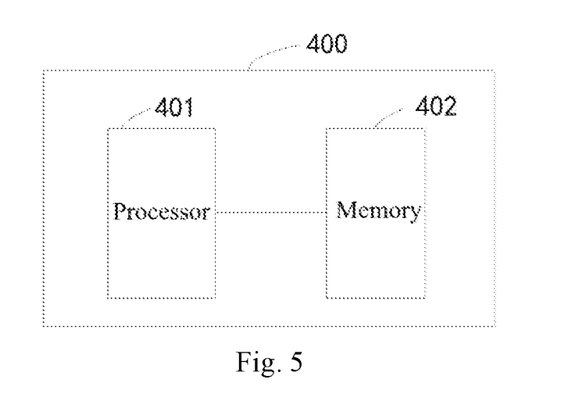
FIG. 5 is a functional block diagram of a mobile terminal according to an embodiment of the present disclosure.

According to another embodiment of the present disclosure, a mobile terminal is disclosed. The mobile terminal could be a smart phone, a tablet or any other electronic device. As shown in FIG. 5, the mobile terminal 400 comprises a processor 401 and a memory 402. The processor 401 is electrically connected to the memory 402.

The processor 401 is the control center of the mobile terminal 400 and is connected to the other components of the mobile terminal through interfaces and buses. The processor 401 executes or loads the application programs stored in the memory 402 and load the data stored in the memory 402 to perform all kinds of functions and process data of the mobile terminal 400. In this way, the memory 402 could monitor and control the mobile terminal 400.

In this embodiment, the processor 401 of the mobile terminal 400 could load the instructions corresponding to one or more application programs into the memory 402 based on the following steps. Then, the processor 401 executes the programs stored in the memory 402 to achieve all kinds of functions:

when a mobile terminal needs to be switched from a first communication network to a second communication network, detecting whether the mobile terminal is in a ringing state;

when the mobile terminal is in the ringing state, then detecting whether the mobile terminal is switched from the ringing state into a connecting state within a predetermined time period; and when the mobile terminal is switched from the ringing state into the connecting state within the predetermined time period, then performing an IMS registration through the second communication network to connect the mobile terminal to the second communication network.

Figure 6:
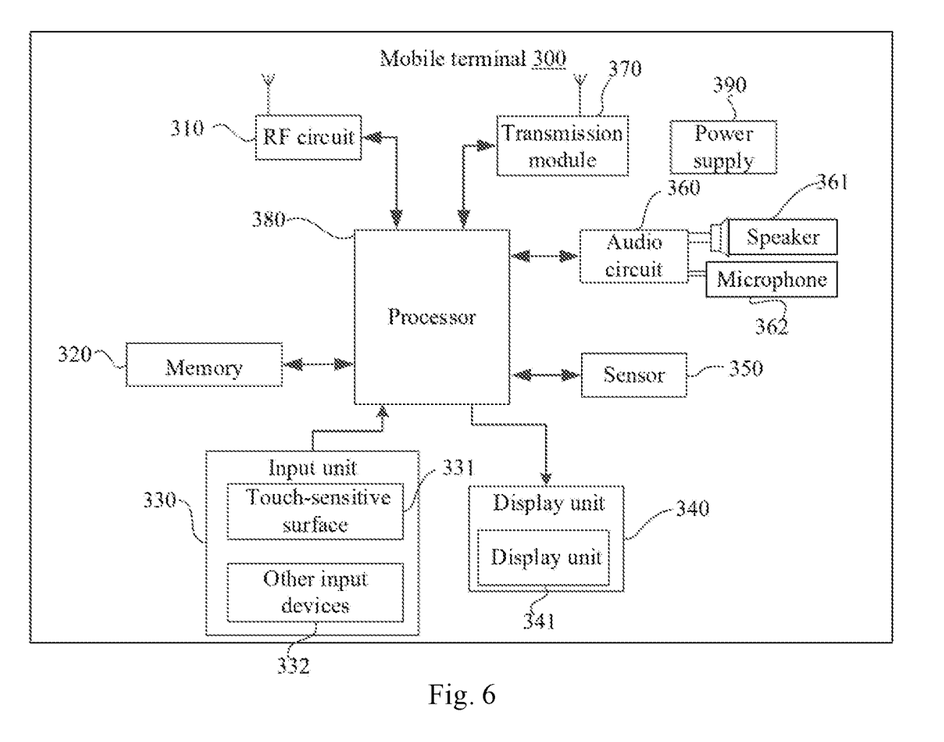
FIG. 6 is a functional block diagram of a mobile terminal according to another embodiment of the present disclosure.

Please refer to FIG. 6. FIG. 6 is a functional block diagram of a mobile terminal according to another embodiment of the present disclosure. A mobile terminal 300 may comprise a Radio Frequency (RF) circuit 310, a memory 320 comprising one or more (only one is shown in the figure) computer-readable storage medium, an input unit 330, a display unit 340, a sensor 350, an audio circuit 360, a speaker 361, a microphone 362, a transmission module 370, a processor 380 comprising one or more (only one is shown in the figure) processing core, a power supply 390, and other components. One having ordinary skills in the art could understand that the structure of the mobile terminal 300 shown in FIG. 6 is not a limitation of the present disclosure. The mobile terminal 300 could comprise more or less components, a combination of some components, or different component arrangements.

The RF circuit 310 may be configured to receive and send a signal during an information receiving and sending process or a conversation process. Specifically, after receiving downlink information from a base station, the RF circuit 310 delivers the downlink information to one or more processors 880 for processing, and sends related uplink data to the base station. Generally, the RF circuit 310 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 310 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE802.11g and IEEE 802.11n, a Voice over Internet Protocol (VoIP), a Worldwide Interoperability for Microwave Access (Wi-Max), any other protocols for e-mail, instant communication and short message, and the like.

The memory 320 may be configured to store a software program and module. The processor 380 runs the software program and module stored in the memory 320, to implement various functional applications and data processing. The memory 320 may mainly include a program storage area and a data storage area. The program storage area may store an operating system, an application program required by at least one function (such as a sound playback function and an image display function), and the like. The data storage area may store data (such as audio data and an address book) created according to use of the mobile terminal, and the like. In addition, the memory 320 may include a high speed random access memory, and may also include a non-volatile memory, such as at least one magnetic disk memory, a flash memory device, or another volatile solid-state memory. Correspondingly, the memory 320 may further include a memory controller, so that the processor 380 and the input unit 330 access the memory 320.

The input unit 330 may be configured to receive input digit or character information, and generate keyboard, mouse, joystick, optical, or track ball signal input related to the user setting and function control. Specifically, the input unit 330 may include a touch-sensitive surface 331 and other input device 332. The touch-sensitive surface 331 may also be referred to as a touch screen or a touch panel, and may collect a touch operation of a user on or near the touch-sensitive surface 331 (such as an operation of a user on or near the touch-sensitive surface by using any suitable object or attachment, such as a finger or a stylus), and drive a corresponding connection apparatus according to a preset program. Optionally, the touch-sensitive surface 331 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 380. Moreover, the touch controller can receive and execute a command sent from the processor 380. In addition, the touch-sensitive surface may be implemented by using various types, such as a resistive type, a capacitance type, an infrared type, and a surface sound wave type. In addition to the touch-sensitive surface 331, the input unit 330 may further include the another input device. Specifically, the another input device 332 may include, but is not limited to, one or more of a physical keyboard, a functional key (such as a volume control key or a switch key), a track ball, a mouse, and a joystick.

The display unit 340 may be configured to display information input by the user or information provided for the user, and various graphical user ports of the mobile terminal. The graphical user ports may be formed by a graph, a text, an icon, a video, and any combination thereof. The display unit 340 may include a display panel. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 380, so as to determine a type of a touch event. Then, the processor 380 provides corresponding visual output on the display panel according to the type of the touch event. Although, in FIG. 8, the touch-sensitive surface and the display panel are used as two separate parts to implement input and output functions, in some embodiments, the touch-sensitive surface and the display panel may be integrated to implement the input and output functions.

The mobile terminal may further include at least one sensor 350, such as an optical sensor, a motion sensor, and other sensors. Specifically, the optical sensor may include an ambient light sensor and a proximity sensor. The ambient light sensor may adjust luminance of the display panel according to brightness of the ambient light. The proximity sensor may switch off the display panel and/or backlight when the mobile terminal is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the mobile terminal are not further described herein.

The audio circuit 360, a speaker 361, and a microphone 362 may provide audio interfaces between the user and the mobile terminal. The audio circuit 360 may transmit, to the speaker 361, a received electric signal converted from received audio data. The speaker 361 converts the electric signal into a sound signal for output. On the other hand, the microphone 362 converts a collected sound signal into an electric signal. The audio circuit 360 receives the electric signal and converts the electric signal into audio data, and outputs the audio data to the processor 380 for processing. Then, the processor 380 sends the audio data to, for example, another terminal by using the RF circuit 310, or outputs the audio data to the memory 320 for further processing. The audio circuit 360 may further include an earplug jack, so as to provide communication between a peripheral earphone and the mobile terminal.

The mobile terminal may help, by using the transmission module 370 (e.g. Wi-Fi module), a user to receive and send an e-mail, browse a webpage, and access stream media, and the like, which provides wireless broadband Internet access for the user. Although FIG. 8 shows the transmission module 370, it may be understood that, the wireless communications unit is not a necessary component of the mobile terminal, and can be ignored according to demands without changing the scope of the essence of the present disclosure.

The processor 380 is a control center of the mobile terminal, and connects various parts of the terminal by using various interfaces and lines. By running or executing the software program and/or module stored in the memory 320, and invoking data stored in the memory 320, the processor 380 performs various functions and data processing of the mobile terminal, thereby performing overall monitoring on the mobile phone. Optionally, the processor 380 may include one or more processing cores. Preferably, the processor 380 may integrate an application processor and a modem. The application processor mainly processes an operating system, a user interface, an application program, and the like. The modem mainly processes wireless communication. It may be understood that, the foregoing modem may not be integrated into the processor 380.

The mobile terminal further includes the power supply 390 (such as a battery) for supplying power to the components. Preferably, the power supply may be logically connected to the processor 380 by using a power supply management system, thereby implementing functions, such as charging, discharging, and power consumption management, by using the power supply management system. The power supply 390 may further include any component, such as one or more direct current or alternate current power supplies, a re-charging system, a power supply fault detection circuit, a power supply converter or an inverter, and a power supply state indicator.

Although not shown, the mobile terminal 300 may further comprise a camera (such as, a front camera, a rear camera), a Bluetooth module, and the like, which will not be described in detail. The display unit 340 of the mobile terminal 300 is a touch screen display. The mobile terminal 300 also comprises the memory 320 and one or more programs, wherein the one or more programs are stored in the memory 320 and are configured to be executed by the one or more processors 380 to perform the operations of:

when a mobile terminal needs to be switched from a first communication network to a second communication network, detecting whether the mobile terminal is in a ringing state;

upon a condition that the mobile terminal is in the ringing state, detecting whether the mobile terminal is switched from the ringing state into a connecting state within a predetermined time period; and upon a condition that the mobile terminal is switched from the ringing state into the connecting state within the predetermined time period, performing an IP Multimedia Subsystem (IMS) registration through the second communication network to connect the mobile terminal to the second communication network.

In addition, the mobile terminal 300 could comprise a camera, such as a front camera or a back camera, and/or a Bluetooth module (not shown). Furthermore, in this embodiment, the display unit 340 is a touch panel. The mobile terminal further comprises a memory storing one or more programs. One or more processors could execute the one or more programs to perform the above switching method.

Each of the above-mentioned modules could be independently implemented or implemented as a whole entity or more entities based on different combinations. The actual implementation of each of the above-mentioned modules could be referred to the above-mentioned embodiments and thus further illustrations are omitted here.

One having ordinary skills in the art could understand that one or more steps in the above-mentioned switching method could be implemented by instruction or by executing instructions to control related hardware. The instruction(s) could be stored in a computer readable storage medium and loaded and executed by a processor. For this, the present disclosure discloses a storage medium. The computer readable medium stores a plurality of instructions. The instructions are executed by a processor to perform one or more steps of any of the above-mentioned switching methods.

The storage medium comprises a read only memory (ROM), a random access memory (RAM), an optical disk or a hard disk.

The instructions stored in the storage medium could be executed to perform the steps of any of the above-mentioned switching methods. Thus, the instructions could be used to achieve the benefits of any of the above-mentioned switching methods. More details could be referred to the above-mentioned embodiments and further illustrations are omitted here.

The implementations of the above operations could be referred to the above-mentioned embodiments and further illustrations are omitted here.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A switching method of a communication network, the switching method comprising:

when a mobile terminal needs to be switched from a first communication network to a second communication network, detecting whether the mobile terminal is in a ringing state;

upon a condition that the mobile terminal is in the ringing state, detecting whether the mobile terminal is switched from the ringing state into a connecting state within a predetermined time period; and upon a condition that the mobile terminal is switched from the ringing state into the connecting state within the predetermined time period, performing an IP Multimedia Subsystem (IMS) registration through the second communication network to connect the mobile terminal to the second communication network;

wherein when the mobile terminal is detected to be in the ringing state, a timer is automatically activated, and the predetermined time period is selected based on a possibility that a called party answers a call;

wherein if the mobile terminal receives a connection information sent by the called party, a call state of the mobile terminal has transitioned from the ringing state to a connected state, and the timer is stopped; if the mobile terminal does not receive the connection information from the called party and also does not receive a termination information, the mobile terminal is still in the ringing state;

wherein the mobile terminal initiates a dialing request to connect to the called party, and when the called party receives a connection request sent by the mobile terminal, the called party feeds back a ringing information, indicating that the mobile terminal is in a ringing state; when the mobile terminal is not in the ringing state, the mobile terminal is directly switched by sending a registration request to an IMS core network via the second communication network based on a connection channel between the mobile terminal and the IMS core network, and upon successful IMS registration, the mobile terminal is connected to the second communication network to accomplish switching of the mobile terminal from the first communication network to the second communication network.

2. The switching method of claim 1, wherein the step of detecting whether the mobile terminal is switched from the ringing state into the connecting state comprises:

activating a timer, wherein a timeout period of the timer is the predetermined time period;

periodically detecting whether the mobile terminal receives a connecting information;

upon a condition that the mobile terminal receives the connecting information, determining that the mobile terminal is switched from the ringing state into the connecting state within the predetermined time period; and upon a condition that the timer passes the timeout period, determining that the mobile terminal is not switched from the ringing state into the connecting state within the predetermined time period.

3. The switching method of claim 2, further comprising:
when the timer passes the timeout period, performing the IMS registration through the second communication network to connect the mobile terminal to the second communication network.

4. The switching method of claim 1, further comprising:
establishing a connection channel between the mobile terminal and the IMS core network before the step of detecting whether the mobile terminal is in the ringing state.

5. The switching method of claim 1, further comprising:
upon a condition that a signal amplitude of the first communication network is detected to be lower than a first threshold value and a signal amplitude of the second communication network reaches a second threshold value, determining that the mobile terminal needs to be switched from the first communication network to the second communication network.

6. The switching method of claim 1, wherein the first communication network is an LTE network and the second communication network is a WiFi network.

7. The switching method of claim 1, wherein the first communication network is a WiFi network and the second communication network is an LTE network.

8. A switching device of a communication network, the switching device comprising:
a first detecting module, configured to detect whether a mobile terminal is in a ringing state when the mobile terminal needs to be switched from a first communication network to a second communication network;
a second detecting module, configured to detect whether the mobile terminal is switched from the ringing state into a connecting state within a predetermined time period if the mobile terminal is in the ringing state; and
a switching module, configured to perform an IP Multimedia Subsystem (IMS) registration through the second communication network to connect the mobile terminal to the second communication network when the mobile terminal is switched from the ringing state into the connecting state within the predetermined time period;
wherein when the mobile terminal is detected to be in the ringing state, a timer is automatically activated, and the predetermined time period is selected based on a possibility that a called party answers a call;
wherein if the mobile terminal receives a connection information sent by the called party, a call state of the mobile terminal has transitioned from the ringing state to a connected state, and the timer is stopped; if the mobile terminal does not receive the connection information from the called party and also does not receive a termination information, the mobile terminal is still in the ringing state;
wherein the mobile terminal initiates a dialing request to connect to the called party, and when the called party receives a connection request sent by the mobile terminal, the called party feeds back a ringing information, indicating that the mobile terminal is in a ringing state; when the mobile terminal is not in the ringing state, the mobile terminal is directly switched by sending a registration request to an IMS core network via the second communication network based on a connection channel between the mobile terminal and the IMS core network, and upon successful IMS registration, the mobile terminal is connected to the second communication network to accomplish switching of the mobile terminal from the first communication network to the second communication network.

9. The switching device of claim 8, wherein the second detecting module comprises:
an activation unit, configured to activate a timer and set a timeout period of the timer as the predetermined time period;
a detecting unit, configured to periodically detect whether the mobile terminal receives a connecting information;
a first determining unit, configured to determine that the mobile terminal is switched from the ringing state into the connecting state within the predetermined time period if the mobile terminal receives the connecting information; and
a second detecting unit, configured to determine that the mobile terminal is not switched from the ringing state into the connecting state within the predetermined time period if the timer passes the timeout period.

10. The switching device of claim 9, wherein the switching module is further configured to perform the IMS registration through the second communication network to connect the mobile terminal to the second communication network when the timer passes the timeout period.

11. The switching device of claim 8, further comprising:
a channel establishment module, configured to establish a connection channel between the mobile terminal and the IMS core network.

12. The switching device of claim 8, further comprising:
a determining module, configured to determine that the mobile terminal needs to be switched from the first communication network to the second communication network when a signal amplitude of the first communication network is detected to be lower than a first threshold value and a signal amplitude of the second communication network reaches a second threshold value.

13. The switching device of claim 8, wherein the first communication network is an LTE network and the second communication network is a WiFi network.

14. A non-transitory computer readable medium, storing instructions executed by a processor to perform operations comprising:
when a mobile terminal needs to be switched from a first communication network to a second communication network, detecting whether the mobile terminal is in a ringing state;
upon a condition that the mobile terminal is in the ringing state, detecting whether the mobile terminal is switched from the ringing state into a connecting state within a predetermined time period; and
upon a condition that the mobile terminal is switched from the ringing state into the connecting state within the predetermined time period, performing an IP Multimedia Subsystem (IMS) registration through the second communication network to connect the mobile terminal to the second communication network;
wherein when the mobile terminal is detected to be in the ringing state, a timer is automatically activated, and the predetermined time period is selected based on a possibility that a called party answers a call;

wherein if the mobile terminal receives a connection information sent by the called party, a call state of the mobile terminal has transitioned from the ringing state to a connected state, and the timer is stopped; if the mobile terminal does not receive the connection information from the called party and also does not receive a termination information, the mobile terminal is still in the ringing state;

wherein the mobile terminal initiates a dialing request to connect to the called party, and when the called party receives a connection request sent by the mobile terminal, the called party feeds back a ringing information, indicating that the mobile terminal is in a ringing state; when the mobile terminal is not in the ringing state, the mobile terminal is directly switched by sending a registration request to an IMS core network via the second communication network based on a connection channel between the mobile terminal and the IMS core network, and upon successful IMS registration, the mobile terminal is connected to the second communication network to accomplish switching of the mobile terminal from the first communication network to the second communication network.

15. The non-transitory computer readable medium of claim 14, wherein the operation of detecting whether the mobile terminal is switched from the ringing state into the connecting state comprises:

activating a timer, wherein a timeout period of the timer is the predetermined time period;

periodically detecting whether the mobile terminal receives a connecting information;

upon a condition that the mobile terminal receives the connecting information, determining that the mobile terminal is switched from the ringing state into the connecting state within the predetermined time period; and upon a condition that the timer passes the timeout period, determining that the mobile terminal is not switched from the ringing state into the connecting state within the predetermined time period.

16. The non-transitory computer readable medium of claim 15, wherein the operations further comprise:

when the timer passes the timeout period, performing the IMS registration through the second communication network to connect the mobile terminal to the second communication network.

17. The non-transitory computer readable medium of claim 14, wherein the operations further comprise:

establishing a connection channel between the mobile terminal and the IMS core network before the step of detecting whether the mobile terminal is in the ringing state.

18. The non-transitory computer readable medium of claim 14, wherein the operations further comprise:

if a signal amplitude of the first communication network is detected to be lower than a first threshold value and a signal amplitude of the second communication network reaches a second threshold value, determining that the mobile terminal needs to be switched from the first communication network to the second communication network.

19. The non-transitory computer readable medium of claim 14, wherein the first communication network is an LTE network and the second communication network is a WiFi network.

20. The non-transitory computer readable medium of claim 14, wherein the first communication network is a WiFi network and the second communication network is an LTE network.

* * * * *